Sept. 6, 1949.
R. R. BEDDOW
2,481,280
PICKUP DEVICE FOR AIRCRAFT
Filed Sept. 19, 1945
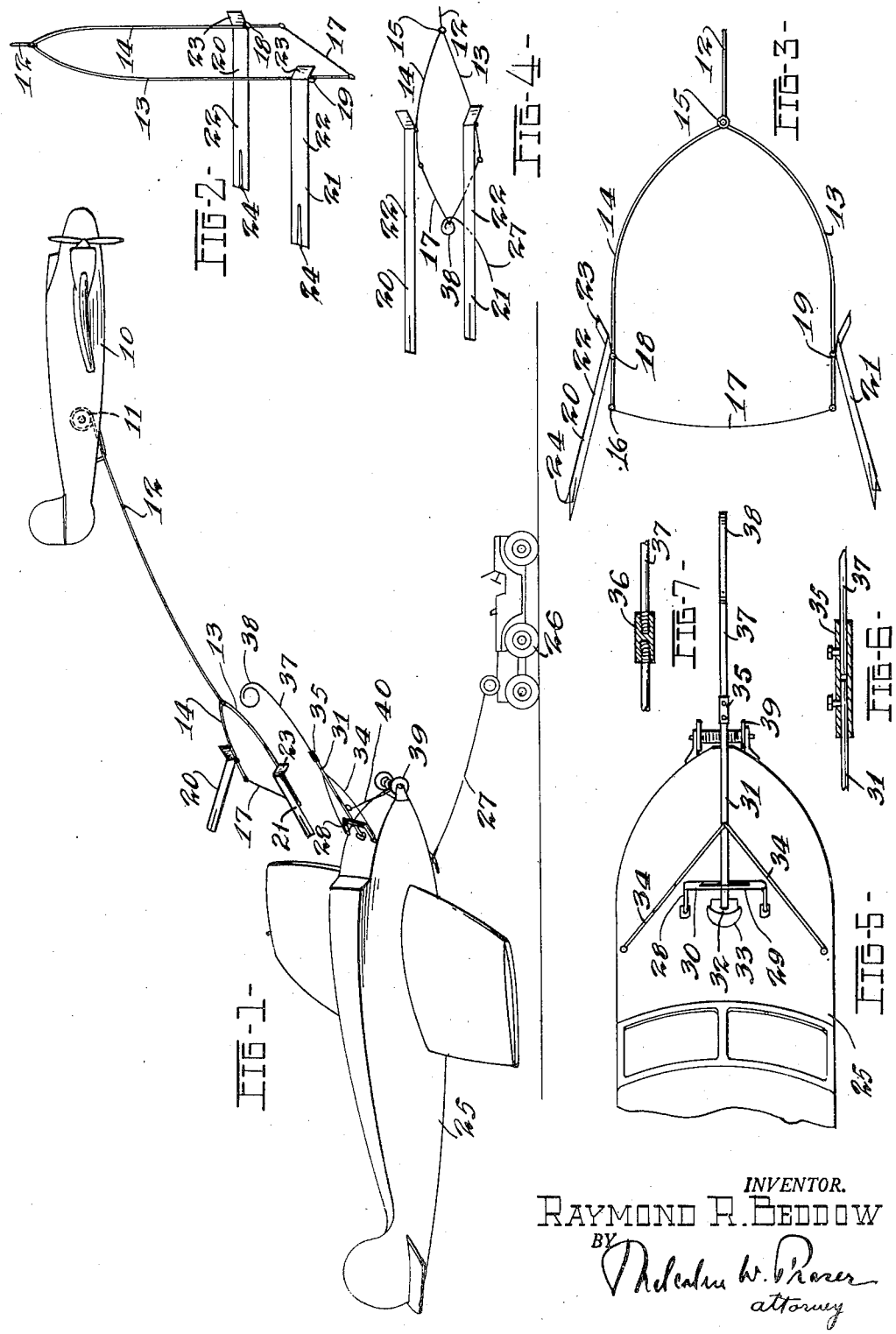
INVENTOR.
RAYMOND R. BEDDOW
BY
Malcolm W. Fraser
attorney Patented Sept. 6, 1949

2,481,280

UNITED STATES PATENT OFFICE 2,481,280

PICKUP DEVICE FOR AIRCRAFT

Raymond R. Beddow, Toledo, Ohio

Application September 19, 1945, Serial No. 617,209

5 Claims. (Cl. 258—1.2)

1

This invention relates to a pickup device for aircraft in flight and is particularly adapted for joining said aircraft to other objects either temporarily placed in flight such as a glider and objects and packages borne by said glider or the like, or relatively light weight packages resting on the ground.

An object of this invention is the production of a pickup device of the above character which may be operated with minimum strain or shock resulting to the connecting means and aircraft. Consequently, the device may be comprised of simple flexible elements requiring a minimum in design and installation, yet affording expeditious and certain operation.

Another object of this invention is the production of a device of the above character comprised of elements which may be withdrawn into the lead plane and easily disassembled therein, thereafter placing reliance on suitable cable means for maintenance of the association.

Another object of this invention is the production of a device of the above character in which the hook element separates from the joined object, and therewith conveying an attached cable to the lead aircraft, said cable thereafter connecting said object to the lead aircraft.

Other objects of the invention reside in the details of construction, arrangement and operation as hereinafter described, and for purposes of illustration but not of limitation, an embodiment of the invention is shown in the accompanying drawings in which Figure 1 is a pictorial view of the relationship prior to connection of the aircraft in flight with the pickup element depending therefrom and a glider with the attached hook and frame elements;

Figure 2 is one view of the pickup means as it would appear suspended vertically and moving in a forwardly direction;

Figure 3 is another view of the pickup means disposed horizontally and moving in a forwardly direction;

Figure 4 is a top view of the hook element and pickup means subsequent to their connection;

Figure 5 is a detailed top view of the hook assembly of Figure 1;

Figure 6 is one clamping means for retaining the separable ribbon-like hook rod in assembled relation; and Figure 7 is another coupling means applicable to tubular hook rods.

The illustrated embodiment of the invention comprises an aircraft 10 including a winch 11 adapted for the retraction or extension of a flexible cable 12 and other attached elements to be subsequently designated. Two relatively short equal length flexible cables 13 and 14 are attached at one end to the free end of the cable 11 by means of an eyelet 15. Suitable metallic weights 16 secured to the other ends of said short cables are joined by means of a flexible cross cord 17. Said flexible cables and cord may be comprised of such materials as braided wire strand, nylon, silk, hemp or other natural or synthetic fibrous or resinous materials generally used in cable manufacture.

Hinges 18 and 19 operable in a vertical plane connect air foils 20 and 21 to the near lower end section of the short cables 13 and 14, said air foils being comprised of a thin wooden or metallic vertical vane 22 in which the portion 23 extending forwardly of the connecting hinge is bent outwardly, and with horizontal fins 24 positioned in the tail portion of the vertical vane.

Manifestly, when the cable 11 is extended in flight, the movement of air causes the air foil to extend laterally and rearwardly in a direction parallel to the air currents, similar to that of a weather vane, whereupon the air foils move outwardly as a result of the reaction between the air stream and the outwardly bent sections 23, which movement causes the short cables 13 and 14 to extend divergently from the lead cable 11. The weighted ends of the short cables effect the extension of said cables in a relatively straight line and also assist the cross cord 17 in limiting the outward movement of said short cables. Thus a loop is formed as shown on Figures 2 and 3, the contour of which may be substantially as illustrated or pentagonal depending on the size, weight and materials from which the elements may be comprised.

A glider 25, temporarily placed in flight by surface traction means 26 and cable 27, contains the hook assembly upon the upper surface of the fuselage. The hook assembly is comprised of a rigid bracket 28 inclining upwardly and forwardly with an elongate slot 29 in the top cross piece 30. A rectangular metallic ribbon or tubular rod 31 extends downwardly through the slotted cross piece and seats into an apertured 32 universal socket 33 attached to the fuselage intermediate of the bracket connections. Thus said rod is inclined upwardly and forwardly through the conjoint action of the universal joint and the slotted bracket, and it is further restrained from longitudinal rocking movement by two breakable cords 34 connected at one end to an intermediate portion of the rod 31, the other ends attaching to the rear edge portions of the fuselage. One or more extension elements may be combined with the rod 31 by means of a sleeve and set screw unit 35 illustrated in Figure 6, applicable for joining rectangular elements or threaded coupling means 36 (Figure 7) applicable to threaded tubular or round sections. The free end of the extension 37 is shaped as a spiral 38 and serves both as the hook and locking means. A spool 39 attached to the forward end of the aircraft retains an elongate flexible cable 40 wound thereon, one end of which is secured to said spool, the other free end being secured to an intermediate portion of the rod 31.

It is manifest that when the loop section of the hooking means attached to the faster moving aircraft contacts the rod 31 or its extensions, the cross cord 17 enters the spiral 38 and remains locked therein as illustrated in Figure 4.

The immediate reaction to the continued forward movement of the aircraft in flight is the generation of force moments, one of which tends to align the rod-like hook elements relative to the position of the lead plane which results in the severance of one or the other of the breakable cords 34 and the subsequent longitudinal rocking movement of the hook element in alignment with said lead plane. Another force moment in the direction of the length of the hook rod causes the withdrawal of the end of the rod 31 from the apertured universal socket 33 and the slotted bracket 30, and the severance of the other breakable cord 34. Thus the rod 31 is disengaged from the glider and its bracket 28 causing the cable 40 to unwind from the spool 39, enabling the hook up elements to be retracted into the lead plane by means of the winch 11, and there disassembled. Further reliance for connection throughout the remainder of the journey is placed upon the cable means 40.

It is to be understood that the hook element may be adapted to other objects either placed in motion conjointly with another aircraft or conveyed along the ground in the same direction as the aircraft in flight. It is also manifest that said hook element may be connected to the glider as described above and the cable means attaching to another object such as a mail bag or package borne by said glider. It is also to be understood that stationary light weight objects situated on the ground may be connected to the aircraft in flight by the above means without excessive strain resulting to the connecting elements.

It is to be understood that numerous changes in details of construction, arrangement and operation may be effected without departing from the spirit of the invention especially as defined in the appended claims.

What I claim is:

1. A pickup device for use in connection with aircraft having a retractable cable and means for extending the cable, said device comprising hooking means in connection with the end of said cable, said hooking means including two short flexible cables connected at one end to said retractable cable, weighted means in connection with the other ends of said short cables, other means in connection with the central portion of said short cables causing them to extend divergently from said retractable cable, flexible means connecting the weighted ends of said short cables, a hook element associated with the object to be picked up, means for maintaining the hook element in a substantially upright position, and a flexible cable extending from said hook element to the object to be picked up.

2. A pickup device for use in connection with an airplane having a retractable cable, comprising hooking means in the form of two short cables connected at one end with the end of the retractable cable, weights on the other ends of said short cables, a flexible cord connecting the weighted ends of the short cables, air foils pivotally connected respectively to an intermediate portion of said short cables, each air foil including a vertical vane, a horizontally disposed fin on the end of said vane, and an outwardly inclined section on the forward end of said vane, which, acting in response to air currents, causes divergence of said air foils, a hook element, means for maintaining said hook element in an upright position, and a cable extending from said hook element to the object to be picked up.

3. A pickup device for use in connection with an airplane having a retractable cable, comprising hooking means on the end of said cable, a hook element, two rigid upright arms connected to the object to be picked up, a slotted horizontal channel arm connecting the end portions of said upright arms, a socket attached to the object to be picked up intermediate said upright arms and in which the said hook element seats, two cords connected at one end to the object to be picked up at points laterally of each upright arm and at their opposite ends to an intermediate portion of said hook element, and a cable extending from said hook element to the object to be picked up.

4. A pickup device for use in connection with an aircraft having a retractable cable and means for the extension of said cable, said device comprising two short flexible cables in connection with the end of the retractable cable, weights attached to the other ends of said short cables, a flexible cord interconnecting the weighted ends limiting the outward movement thereof, an elongate vane pivotally connected to an intermediate portion of each short cable permitting rotational movement in a vertical plane, a vane section integrally connected to each forward end of said elongate vane and bent outwardly thereform forcing said vanes apart in cooperation with the air currents, two upright bracket arms attached to a surface adjacent the object to be picked up, a slotted cross arm interconnecting the upper end portions of said bracket arms, a universal socket disposed intermediate of the bracket arms, an elongate element insertable through the slotted cross arm and into the universal socket, a spiral integral with the upper end of said elongate element, two cords attached to said elongate element and inclined laterally therefrom, the other ends attaching to the surface adjacent to said bracket arms, a cable attached at one end to the elongate element and at the other end to a spool, and means for attachment of said spool to the object to be picked up.

5. In a pickup device for use with an aircraft in flight having a retractable cable and means for extension and retraction of said cable, said device comprising two short cables in connection with the end of the retractable cable, weights attached to the lower ends of the short cables and a cord interconnecting the weighted ends, two elongate vanes having the forward portion bent outwardly and a horizontal fin in the tail section, pivotal connection between each elongate vane and an intermediate portion of each short cable, two upright bracket arms attached to the object to be picked up, a slotted cross arm interconnecting the upper ends of each bracket arm, a socket arms, one or more connecting straight elements, attached to said object intermediate the bracket arms, one or more connecting straight elements, a spiral integral with the upper end of the connected straight elements, cords connecting the intermediate portion of said connected straight elements with lateral portions of the object to be picked up preventing lateral rocking movement of the straight element, a cable attached at one end to an intermediate portion of the connected straight element and the other end to a spool, and means for connection of said spool to the object to be picked up.

RAYMOND R. BEDDOW.

REFERENCES CITED

The following references are of record in the file of this patent:

UNITED STATES PATENTS

| Number | Name | Date |
| --- | --- | --- |
| 1,999,777 | Palmer | Apr. 30, 1935 |
| 2,193,312 | Cobham et al. | Mar. 12, 1940 |
| 2,418,702 | DuPont | Apr. 8, 1947 |

FOREIGN PATENTS

| Number | Country | Date |
| --- | --- | --- |
| 334,044 | Germany | Mar. 9, 1921 |